United States Patent
Mathur et al.

(10) Patent No.: US 12,516,069 B2
(45) Date of Patent: Jan. 6, 2026

(54) PROCESS FOR THE PREPARATION OF PYRAZOLE-OXADIAZEPINE

(71) Applicant: Gharda Chemicals Limited, Maharashtra (IN)

(72) Inventors: Suchet Saran Mathur, Maharashtra (IN); Pragnesh Dalpatram Damania, Maharashtra (IN); A. Kalirajan, Maharashtra (IN); Rahul Harishchandra Khamkar, Maharashtra (IN); Mahesh Vishwas Pawar, Maharashtra (IN); Prashant Arun Deshmukh, Maharashtra (IN)

(73) Assignee: GHARDA CHEMICALS LIMITED, Maharashtra (IN)

( * ) Notice: Subject to any disclaimer, the term of this patent is extended or adjusted under 35 U.S.C. 154(b) by 399 days.

(21) Appl. No.: 18/266,567

(22) PCT Filed: Dec. 11, 2021

(86) PCT No.: PCT/IB2021/061604
§ 371 (c)(1),
(2) Date: Jun. 9, 2023

(87) PCT Pub. No.: WO2022/123541
PCT Pub. Date: Jun. 16, 2022

(65) Prior Publication Data
US 2024/0059707 A1    Feb. 22, 2024

(30) Foreign Application Priority Data
Dec. 11, 2020 (IN) .............................. 202021054055

(51) Int. Cl.
*C07D 498/04* (2006.01)

(52) U.S. Cl.
CPC ................................. *C07D 498/04* (2013.01)

(58) Field of Classification Search
CPC ...................................................... C07D 498/04
See application file for complete search history.

(56) References Cited

U.S. PATENT DOCUMENTS 6,552,187 B1 * 4/2003 Maetzke ............... C07C 233/11
540/545
2004/0198797 A1 * 10/2004 Maetzke ............. C07D 498/04
514/404

OTHER PUBLICATIONS

International Search Report issued Mar. 28, 2022 in PCT/IB2021/061604.

* cited by examiner

*Primary Examiner* — D Margaret M Seaman
(74) *Attorney, Agent, or Firm* — Panitch Schwarze Belisario & Nadel LLP

(57) ABSTRACT

The present disclosure relates to a process for the preparation of pyrazole-oxadiazepine. The process of the present disclosure reduces solvent use, uses inexpensive and easily available reagents. The process is simple, efficient, environment friendly, and provides pyrazole-oxadiazepine with high purity and high yield.

13 Claims, No Drawings

PROCESS FOR THE PREPARATION OF PYRAZOLE-OXADIAZEPINE

CROSS-REFERENCE TO RELATED APPLICATIONS

This application is a Section 371 of International Application No. PCT/IB2021/061604, filed Dec. 11, 2021, which was published in the English language on Jun. 16, 2022 under International Publication No. WO 2022/123541 A1, which claims priority under 35 U.S.C. § 119 (b) to Indian Application No. 202021054055, filed Dec. 11, 2020, the disclosures of which are incorporated herein by reference in their entireties.

FIELD

The present disclosure relates to a process for the preparation of pyrazole-oxadiazepine.

BACKGROUND

The background information hereinbelow relates to the present disclosure but is not necessarily prior art.

Pyrazole-oxadiazepine is an intermediate used in the preparation of Pinoxaden. The structure of pyrazole-oxadiazepine is represented below as:

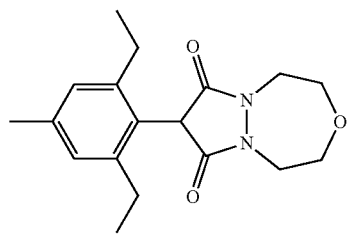

Pyrazole-oxadiazepine

The structure in the keto-enol form of pyrazole-oxadiazepine can be represented as:

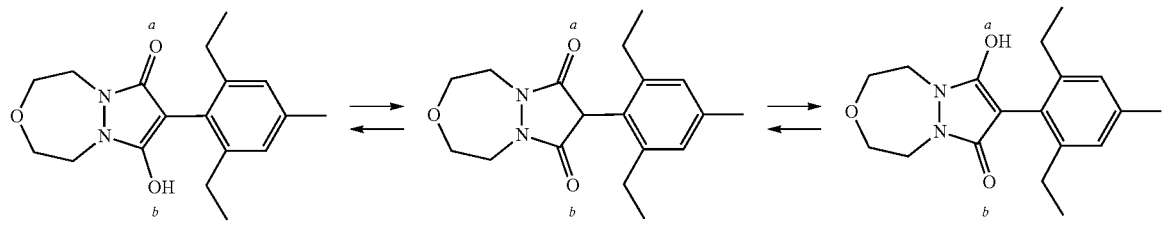 [SMILES: CCc1cc(C)cc(CC)c1-c1c(O)n2n(c1=O)CCOCC2 ; CCc1cc(C)cc(CC)c1C1C(=O)N2CCOCCN2C1=O ; CCc1cc(C)cc(CC)c1-c1c(O)n2n(c1=O)CCOCC2]

Conventional processes disclose reacting 2-(2,6-diethyl-4-methyl-phenyl)-malonamide with [1,4,5]oxadiazepine dihydrobromide to obtain pyrazole-oxadiazepine. However, such processes suffer from the drawbacks such as handling, storage, and drying of [1,4,5]oxadiazepine or its salts such as HCl salt (mono or di-salts) or HBr salt (mono or di-salt), and the like. Further, a large volume of solvents is required for the conventional processes for synthesizing pyrazole-oxadiazepine and also requires multiple steps to arrive at oxadiazepine salt.

Therefore, there is felt a need to provide a process for the preparation of pyrazole-oxadiazepine that mitigates the drawbacks mentioned hereinabove.

OBJECTS

Some of the objects of the present disclosure, which at least one embodiment herein satisfies, are as follows:

An object of the present disclosure is to ameliorate one or more problems of the prior art or to at least provide a useful alternative.

Another object of the present disclosure is to provide a process for the preparation of pyrazole-oxadiazepine.

Still another object of the present disclosure is to provide a process for the preparation of pyrazole-oxadiazepine that is simple and cost-effective.

Other objects and advantages of the present disclosure will be more apparent from the following description, which is not intended to limit the scope of the present disclosure.

SUMMARY

The present disclosure relates to a process for the preparation of pyrazole-oxadiazepine. The process comprises reacting predetermined amounts of 2-(2,6-diethyl-4-methylphenyl)-malonamide and hydrazine salt by using a first base in a first fluid medium to obtain a reaction mixture. The reaction mixture is heated at a first predetermined temperature for a first predetermined time period to obtain 4-(2,6-diethyl-4-methyl-phenyl)-pyrazolidine-3,5-dione. The so obtained 4-(2,6-diethyl-4-methyl-phenyl)-pyrazolidine-3,5-dione is reacted with dichloro-diethyl ether by using a second base in a second fluid medium at a second predetermined temperature in an inert atmosphere to obtain 8-(2,6-diethyl-4-methylphenyl)-tetrahydro-7H-pyrazolo[1,2-d][1,4,5]-oxadiazepine-7,9 (8H)-dione (pyrazole-oxadiazepine).

DETAILED DESCRIPTION

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

Pinoxaden belongs to the class of phenylpyrazoline and is an herbicide. Pyrazole-oxadiazepine is an intermediate used for the synthesis of Pinoxaden. The structure of pyrazole-oxadiazepine is represented below:

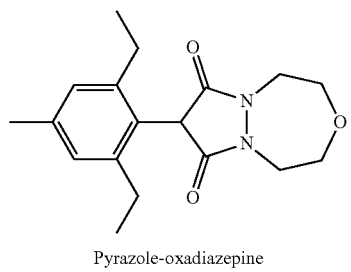 [SMILES: CCc1cc(C)cc(CC)c1C1C(=O)N2CCOCCN2C1=O]

Pyrazole-oxadiazepine

Conventional processes disclose reacting 2-(2,6-diethyl-4-methyl-phenyl)-malonamide with [1,4,5]oxadiazepine dihydrobromide to obtain pyrazole-oxadiazepine. However, the conventional processes suffer from the drawbacks such as handling, storage, and drying of [1,4,5]oxadiazepine or its salts such as HCl salt (mono or di-salts) or HBr salt (mono or di-salt), and the like. Secondly, a large volume of solvents is required during the process and also requires multiple steps to arrive at oxadiazepine salt.

The present disclosure provides a process for the preparation of pyrazole-oxadiazepine. The present disclosure particularly provides a process for the synthesis of 8-(2,6-diethyl-4-methylphenyl)-tetrahydro-7H-pyrazolo[1,2-d][1,4,5]-oxadiazepine-7,9-(8H)-dione abbreviated as 'pyrazole-oxadiazepine' and 'oxapyra-intermediate'.

The present disclosure relates to the process for preparing 8-(2,6-Diethyl-4-methylphenyl)-tetrahydro-7H-pyrazolo[1,2-d][1,4,5]-oxadiazepine-7,9 (8H)-dione.

The process is described in detail.

In a first step, predetermined amounts of 2-(2,6-diethyl-4-methyl-phenyl)-malonamide and hydrazine salt are reacted by using a first base in a first fluid medium to obtain a reaction mixture.

In accordance with an embodiment of the present disclosure, the first base is at least one selected from the group consisting of inorganic base, organic base, and alkaline salts.

In accordance with an embodiment of the present disclosure, the first base is at least one selected from the group consisting of triethylamine, trimethylamine, tripropylamine, tributylamine, and pyridine. In an exemplary embodiment, the first base is triethylamine.

In accordance with an embodiment of the present disclosure, the first fluid medium is at least one selected from the group consisting of aliphatic hydrocarbons, aromatic hydrocarbons, halo-hydrocarbons, and polar solvents.

In accordance with an embodiment of the present disclosure, the first fluid medium is at least one selected from the group consisting of xylene, toluene, mono chlorobenzene (MCB), and ortho dichlorobenzene (ODCB). In an exemplary embodiment, the first fluid medium is xylene.

In accordance with an embodiment of the present disclosure, the mole ratio of 2-(2,6-diethyl-4-methyl-phenyl)-malonamide to the hydrazine salt is in the range of 1:1 to 1:2.5. In an exemplary embodiment, the mole ratio of 2-(2,6-diethyl-4-methyl-phenyl)-malonamide to the hydrazine salt is 1:1.1.

In a second step, the reaction mixture is subjected to heating at a first predetermined temperature for a first predetermined time period to obtain 4-(2,6-diethyl-4-methyl-phenyl)-pyrazolidine-3,5-dione.

In accordance with an embodiment of the present disclosure, the first predetermined temperature is in the range of 120° C. to 150° C. In an exemplary embodiment, the first predetermined temperature is 140° C.

In accordance with an embodiment of the present disclosure, the first predetermined time period is in the range of 1 hour to 3 hours. In an exemplary embodiment, the first predetermined time period is 2 hours.

In an embodiment, the crude 4-(2,6-diethyl-4-methyl-phenyl)-pyrazolidine-3,5-dione is purified by using ethylene dichloride (EDC).

The schematic representation of the preparation of 4-(2,6-diethyl-4-methyl-phenyl)-pyrazolidine-3,5-dione in accordance with the present disclosure is given below as Scheme 1.

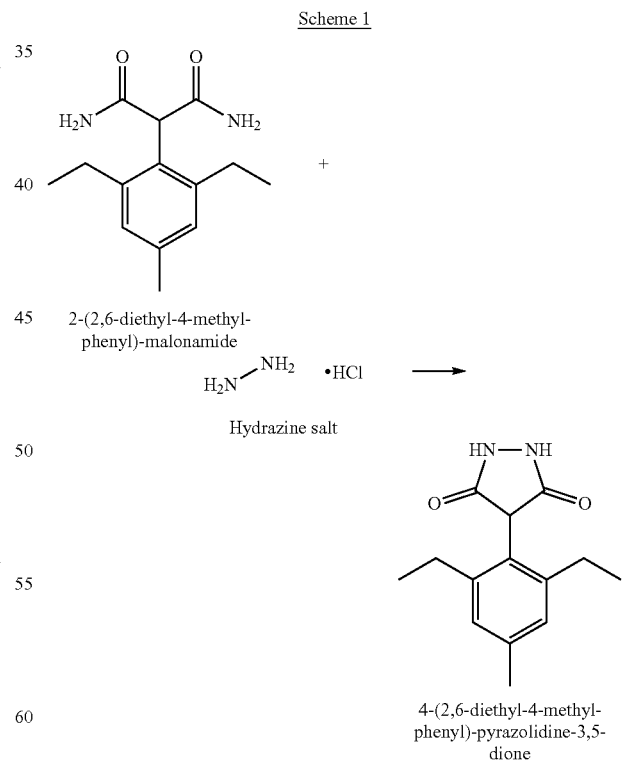

In a third step, 4-(2,6-diethyl-4-methyl-phenyl)-pyrazolidine-3,5-dione is reacted with a predetermined amount of dichloro-diethyl ether by using a second base in a second fluid medium at a second predetermined temperature in an inert atmosphere to obtain 8-(2,6-Diethyl-4-methylphenyl)-tetrahydro-7H-pyrazolo[1,2-d][1,4,5]-oxadiazepine-7,9 (8H)-dione.

In accordance with an embodiment of the present disclosure, the second fluid medium is at least one selected from the group consisting of dimethyl sulfoxide (DMSO), methanol, and ethanol. In an exemplary embodiment, the second fluid medium is dimethyl sulfoxide (DMSO).

In accordance with an embodiment of the present disclosure, the second base is at least one selected from the group consisting of sodium hydride, sodium-tert-butoxide, sodium methoxide, potassium hydroxide, and sodium hydroxide. In an exemplary embodiment, the second base is sodium hydride. In another exemplary embodiment, the second base is sodium-tert-butoxide. In yet another exemplary embodiment, the second base is sodium methoxide. In still another exemplary embodiment, the second base is potassium hydroxide and sodium hydroxide.

In accordance with an embodiment of the present disclosure, the base is added slowly and carefully for controlling the exotherm of the reaction.

In accordance with an embodiment of the present disclosure, the second predetermined temperature is in the range of 20° C. to 50° C. In an exemplary embodiment, the second predetermined temperature is 25° C.

In accordance with an embodiment of the present disclosure, the inert atmosphere is at least one selected from nitrogen and argon. In an exemplary embodiment, the inert atmosphere is nitrogen.

In accordance with an embodiment of the present disclosure, the mole ratio of 4-(2,6-diethyl-4-methyl-phenyl)-pyrazolidine-3,5-dione to dichloro-diethyl ether is in the range of 1:1 to 1:1.3. In an exemplary embodiment, the mole ratio is 1:1.08. In another exemplary embodiment, the mole ratio is 1:1.09. In yet another exemplary embodiment, the mole ratio is 1:1.1.

The schematic representation for the preparation of 8-(2,6-Diethyl-4-methylphenyl)-tetrahydro-7H-pyrazolo[1,2-d][1,4,5]oxadiazepine-7,9(8H)-dione (pyrazole-oxadiazepine) in accordance with the present disclosure is given below as Scheme 2.

Scheme 2

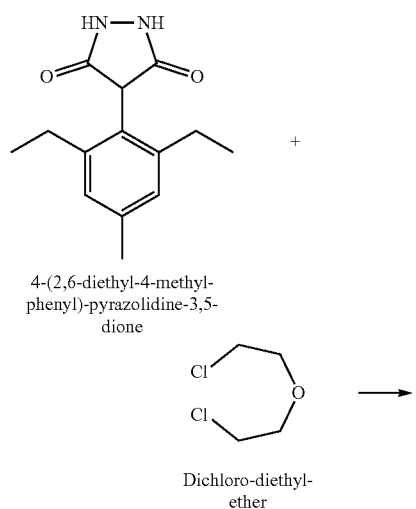

4-(2,6-diethyl-4-methyl-phenyl)-pyrazolidine-3,5-dione

+

Dichloro-diethyl-ether

→

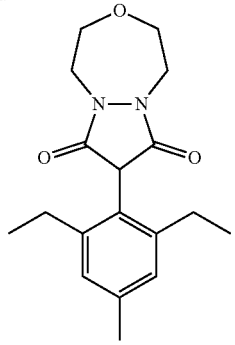

8-(2,6-Diethyl-4-methylphenyl)-tetrahydro-7H-pyrazolo[1,2-d][1,4,5]oxadiazepine-7,9(8H)-dione The process of the present disclosure avoids preparation, handling, storage, and drying of hexahydro-1,4,5-oxadiazepine or its salts such as mono·HCl salt, mono·HBr salt, di·HCl salt, di·HBr salt, and the like for the synthesis of Pinoxaden. In a way, the process of the present disclosure reduces the number of steps in Pinoxaden synthesis; hence the process is efficient, cost-effective, and environmentally friendly.

The process of the present disclosure employs inexpensive and easily available reagents. Thus, the process of the present disclosure is economical.

The process of the present disclosure is simple, reduces solvent use, and is environmentally friendly.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purposes only and not to be construed for limiting the scope of the disclosure. The following experiments can be scaled up to industrial/commercial scale and the results obtained can be extrapolated to industrial scale.

EXPERIMENTAL DETAILS

Experiment 1

Step I—Preparation of 4-(2,6-diethyl-4-methyl-phenyl)-pyrazolidine-3,5-dione in Accordance with the Present Disclosure Example 1

12.6 gms (0.05 moles, of 98.6% purity) of 2-(2,6-diethyl-4-methyl-phenyl)-malonamide and 6 gms (0.055 moles) of hydrazine·2HCl salt were charged into a reactor followed by adding 15.3 gms (0.15 moles) of triethylamine and 200 ml of xylene to obtain a reaction mixture. The temperature of the reaction mixture was raised to 140° C. and heated (at 140° C.) for 2 hours to obtain a reaction mass comprising 4-(2,6-diethyl-4-methyl-phenyl)-pyrazolidine-3,5-dione (HPLC showed 99.0% conversion with starting amine <1.0%).

Example 2

2 liters of xylene was charged into a reactor followed by adding 126.4 gms (0.5 moles of 98.16% purity) of 2-(2,6-diethyl-4-methyl-phenyl)-malonamide and 57.75 gms (0.55 moles) of hydrazine·2HCl salt, to obtain a mixture. A portion of xylene in the mixture was distilled below 55° C. to ensure the system is free of moisture. 152 gms (1.5 moles) of triethylamine was added to the mixture to obtain a reaction mixture. The temperature of the reaction mixture was raised to 140° C. and heated for 2 hours to obtain a reaction mass. The reaction mass was cooled in an ice bath to obtain a cooled slurry. Water was added to the cooled slurry and pH was adjusted in the range of 3 to 4 by using 30 ml $H_2SO_4$ to obtain a product mixture comprising 4-(2,6-diethyl-4-methyl-phenyl)-pyrazolidine-3,5-dione. The product mixture so obtained was filtered, washed, and dried to obtain a crude 4-(2,6-diethyl-4-methyl-phenyl)-pyrazolidine-3,5-dione. The weight of the crude 4-(2,6-diethyl-4-methyl-phenyl)-pyrazolidine-3,5-dione was 119.8 gms that correspond to 97 wt %.

100 gms of the crude 4-(2,6-diethyl-4-methyl-phenyl)-pyrazolidine-3,5-dione was purified by crystallization by using 500 ml of hot ethylene dichloride (EDC) to obtain a highly pure 4-(2,6-diethyl-4-methyl-phenyl)-pyrazolidine-3,5-dione product of >99.5% purity by HPLC method. The yield was 60%.

Experiment 2

Step II—Preparation of 8-(2,6-Diethyl-4-methylphenyl)-tetrahydro-7H-pyrazolo[1,2-d][1,4,5]-oxadiazepine-7,9(8H)-dione in Accordance with the Present Disclosure Example 3

40 ml dry DMSO (dimethyl sulfoxide) was charged into a reactor maintained under a high purity nitrogen atmosphere. 10 gms (0.0406 moles, 99.8% purity) 4-(2,6-diethyl-4-methyl-phenyl)-pyrazolidine-3,5-dione and 6.6 gms (0.044 moles) of dichloro-diethyl ether were added into the reactor followed by adding 4.22 gms (60% purity, 0.1055 moles) sodium hydride slowly and carefully, under stirring for 2 hours at 25° C. to obtain a product mixture comprising 8-(2,6-Diethyl-4-methylphenyl)-tetrahydro-7H-pyrazolo[1,2-d][1,4,5]-oxadiazepine-7,9(8H) dione. HPLC analysis indicated 90% of the product formation with <1% starting material remained unreacted.

8-(2,6-Diethyl-4-methylphenyl)-tetrahydro-7H-pyrazolo[1,2-d][1,4,5]-oxadiazepine-7,9 (8H)-dione was isolated by acidification with 15 ml acetic acid and drowning in ice water (150 ml), made to acidic pH by using 6 ml HCl, and was extracted with 50 ml methylene dichloride (MDC). On de-volatilization of methylene dichloride (MDC), 11.95 gms of solids of 8-(2,6-Diethyl-4-methylphenyl)-tetrahydro-7H-pyrazolo[1,2-d][1,4,5]-oxadiazepine-7,9 (8H)-dione were obtained with 93 wt % yield and purity was 86% (by HPLC).

Example 4

150 ml dry DMSO (dimethyl sulfoxide) was charged into a reactor maintained under a high purity nitrogen atmosphere. 29 gms (0.117 moles, 99.8% purity) 4-(2,6-diethyl-4-methyl-phenyl)-pyrazolidine-3,5-dione and 19.1 gms (0.129 moles) of dichloro-diethyl-ether were added into the reactor followed by adding 29.2 gms (0.3 moles) sodium tert-butoxide slowly and carefully, by controlling exotherm under stirring for 1 hour at 25° C. to 35° C. to obtain a product mixture comprising 8-(2,6-Diethyl-4-methylphenyl)-tetrahydro-7H-pyrazolo[1,2-d][1,4,5]-oxadiazepine-7,9 (8H)-dione. HPLC analysis indicated 90% of the product formation with <1% starting material remained unreacted.

8-(2,6-Diethyl-4-methylphenyl)-tetrahydro-7H-pyrazolo[1,2-d][1,4,5]-oxadiazepine-7,9 (8H)-dione was isolated by drowning the product mixture in 483 ml ice water, acidified by using 22.3 ml HCl, and extracted with 335 ml methylene dichloride (MDC). On de-volatilization of methylene dichloride, 34 gms of solids of 8-(2,6-Diethyl-4-methylphenyl)-tetrahydro-7H-pyrazolo[1,2-d][1,4,5]-oxadiazepine-7,9 (8H)-dione were obtained with 92 wt % yield and purity was 91% (by HPLC).

Example 5

60 ml dry DMSO (dimethyl sulfoxide) was charged into a reactor maintained under a high purity nitrogen atmosphere. 10 gms of (0.0406 moles, 99.54% purity) 4-(2,6-diethyl-4-methyl-phenyl)-pyrazolidine-3,5-dione and 6.41 gms (0.0446 moles) of dichloro-diethyl-ether were added into the reactor followed by adding 6 gms (0.106 moles) of sodium methoxide slowly and carefully, under stirring for 1 hour at 25° C. to obtain a product mixture comprising 8-(2,6-Diethyl-4-methylphenyl)-tetrahydro-7H-pyrazolo[1,2-d][1,4,5]-oxadiazepine-7,9-(8H)-dione.

HPLC analysis indicated 89% product formation with <1% starting material remained unreacted.

Example 6

57 ml dry DMSO (dimethyl sulfoxide) was charged into a reactor maintained under a high purity nitrogen atmosphere. 10 gms of (0.0406 moles, 99.54% purity) 4-(2,6-diethyl-4-methyl-phenyl)-pyrazolidine-3,5-dione and 6.41 gms (0.0446 moles) of dichloro-diethyl-ether were added into the reactor followed by adding 6.95 gms (0.106 moles) potassium hydroxide slowly and carefully, under stirring for 1 hour at 25° C. to 35° C. to obtain a product mixture comprising 8-(2,6-Diethyl-4-methylphenyl)-tetrahydro-7H-pyrazolo[1,2-d][1,4,5]-oxadiazepine-7,9-(8H)-dione.

HPLC analysis indicated 91% product formation with <1% starting material remained unreacted.

Example 7

57 ml dry DMSO (dimethyl sulfoxide) was charged into a reactor maintained under a high purity nitrogen atmosphere. 10 gms of (0.0406 moles, 99.54% purity) 4-(2,6-diethyl-4-methyl-phenyl)-pyrazolidine-3,5-dione and 6.41 gms (0.0446 moles) of dichloro-diethyl-ether were added into the reactor followed by adding 4.3 gms (0.106 moles) sodium hydroxide flakes slowly and carefully, under stirring for 1 hour at 25° C. to 35° C. to obtain a product mixture comprising 8-(2,6-Diethyl-4-methylphenyl)-tetrahydro-7H-pyrazolo[1,2-d][1,4,5]-oxadiazepine-7,9-(8H)-dione. The purity of 8-(2,6-Diethyl-4-methylphenyl)-tetrahydro-7H-pyrazolo[1,2-d][1,4,5]-oxadiazepine-7,9-(8H)-dione was 66% by HPLC and the yield was 70 wt %.

HPLC analysis indicated 90% product formation with <2% starting material remained unreacted.

It is evident from the above experiment details that better yield and purity was obtained by using sodium tert-butoxide and sodium hydride.

TECHNICAL ADVANCEMENTS

The present disclosure described hereinabove has several technical advantages including, but not limited to, the realization of a process for the preparation of pyrazole-oxadiazepine (an intermediate of Pinoxaden), which
- is simple and economical;
- reduces solvent use;
- avoids preparation, handling, storage, drying of hexahydro-1,4,5-oxadiazepine or its salts;
- reduces the number of steps in the process of preparing Pinoxaden; and
- employs easily available and comparatively cheap raw materials hence cost-effective.

Throughout this specification, the word "comprise", or variations such as "comprises" or "comprising, will be understood to imply the inclusion of a stated element, integer or step," or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions, and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing pyrazole-oxadiazepine, said process comprising the following steps:

a) reacting predetermined amounts of 2-(2,6-diethyl-4-methyl-phenyl)-malonamide and hydrazine salt by using a first base in a first fluid medium to obtain a reaction mixture;
   b) heating said reaction mixture at a first predetermined temperature for a first predetermined time period to obtain 4-(2,6-diethyl-4-methyl-phenyl)-pyrazolidine-3,5-dione; and
   c) reacting 4-(2,6-diethyl-4-methyl-phenyl)-pyrazolidine-3,5-dione with a predetermined amount of dichloro-diethyl ether by using a second base in a second fluid medium at a second predetermined temperature in an inert atmosphere to obtain 8-(2,6-Diethyl-4-methylphenyl)-tetrahydro-7H-pyrazolo[1,2-d][1,4,5]-oxadiazepine-7,9 (8H)-dione (pyrazole-oxadiazepine).

2. The process as claimed in claim 1, wherein said first base is at least one selected from the group consisting of inorganic base, organic base, and alkaline salts.

3. The process as claimed in claim 1, wherein said first base is at least one selected from the group consisting of triethylamine, trimethylamine, tripropylamine, tributylamine, and pyridine.

4. The process as claimed in claim 1, wherein said first fluid medium is at least one selected from the group consisting of aliphatic hydrocarbons, aromatic hydrocarbons, halo-hydrocarbons, and polar solvents.

5. The process as claimed in claim 1, wherein said first fluid medium is at least one selected from the group consisting of xylene, toluene, mono chlorobenzene (MCB), and ortho dichlorobenzene (ODCB).

6. The process as claimed in claim 1, wherein said first predetermined temperature is in the range of 120° C. to 150° C.

7. The process as claimed in claim 1, wherein said first predetermined time period is in the range of 1 hour to 3 hours.

8. The process as claimed in claim 1, wherein said second fluid medium is at least one selected from the group consisting of dimethyl sulfoxide (DMSO), methanol, and ethanol.

9. The process as claimed in claim 1, wherein said second base is at least one selected from the group consisting of sodium hydride, sodium-tert-butoxide, sodium methoxide, potassium hydroxide, and sodium hydroxide.

10. The process as claimed in claim 1, wherein said second predetermined temperature is in the range of 20° C. to 50° C.

11. The process as claimed in claim 1, wherein said inert atmosphere is selected from nitrogen and argon.

12. The process as claimed in claim 1, wherein a mole ratio of 2-(2,6-diethyl-4-methyl-phenyl)-malonamide to the hydrazine salt is in the range of 1:1 to 1:2.5.

13. The process as claimed in claim 1, wherein a mole ratio of 4-(2,6-diethyl-4-methyl-phenyl)-pyrazolidine-3,5-dione to dichloro-diethyl ether is in the range of 1:1 to 1:1.3.

* * * * *